United States Patent Office 3,272,340
Patented Sept. 13, 1966

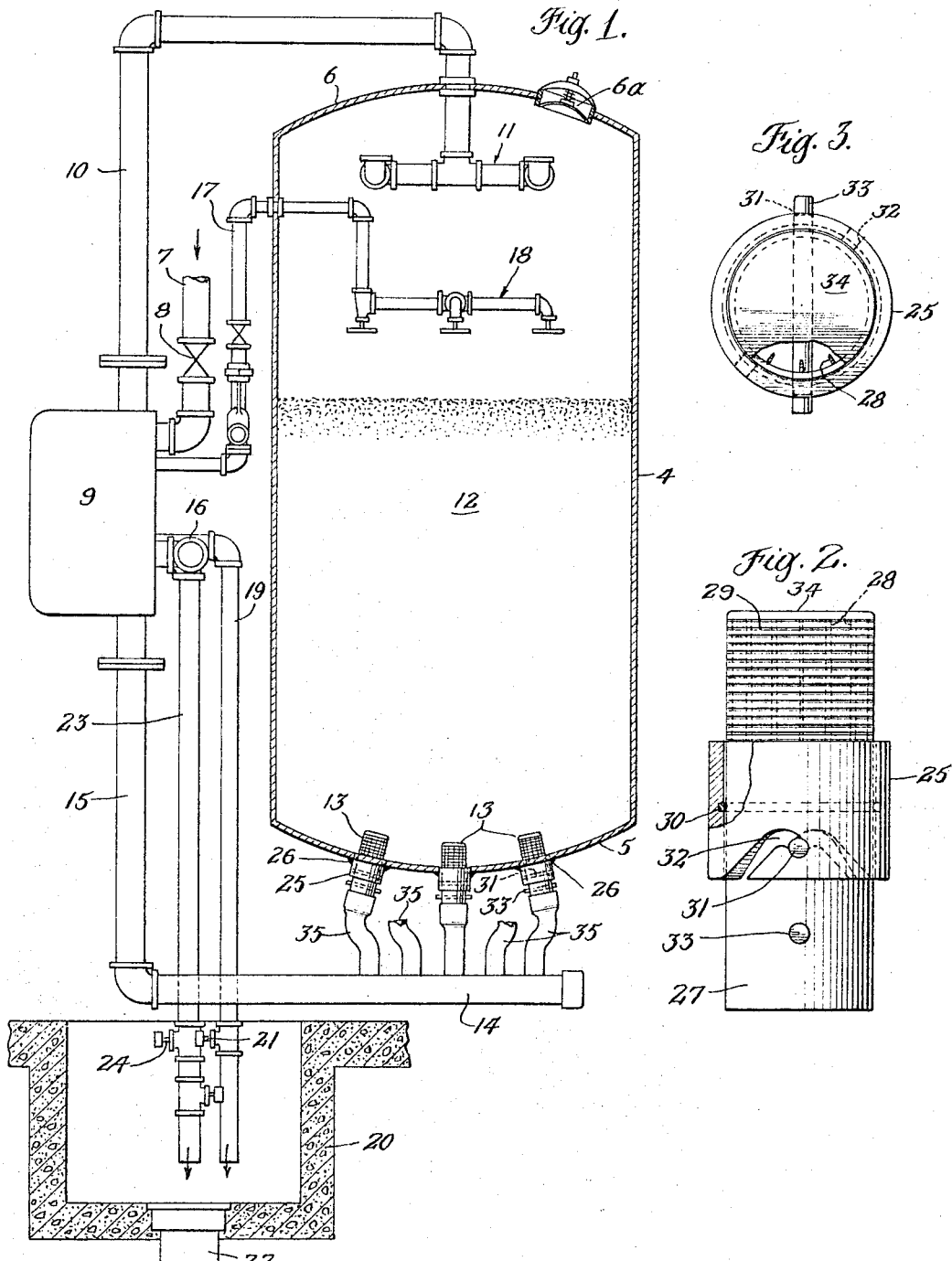

3,272,340
QUICKLY DETACHABLE STRAINER SYSTEM FOR WATER TREATMENT TANKS
Churchill Hungerford, Jr., Wenonah, N.J., assignor to Hungerford & Terry, Inc., Clayton, N.J., a corporation of Delaware
Filed May 22, 1963, Ser. No. 282,258
4 Claims. (Cl. 210—232)

This invention relates to equipment for filtering, softening, or otherwise treating or purifying water by passing it through a filter-type bed of granular, spherical or small-sized particles of treating material contained in a suitable tank and provided with supply and discharge connections and means for distributing the flow through the bed. Equipment of this type is well known to the art and the present invention relates to the provision of certain improvements in the equipment by means of which some of the problems and difficulties heretofore encountered are greatly minimized or even completely eliminated.

Before stating the principal objects of the invention it should be kept in mind that in equipment of the general character referred to it has been customary to install distributing systems inside the tank, which systems usually include a plurality of strainer members or heads suitably mounted on collector manifolds, which manifolds are connected to the piping outside the tank by means of conduits which pass through the side walls of the tank. In large industrial units such distributing equipment has to be installed by a workman who enters the interior of the tank usually through a manhole at the top, through which manhole the various parts making up the distributing system are also introduced.

In prior equipment it has also been common practice to employ a perforated plate which is generally located a short distance above the bottom of the tank upon which plate the water treating material is supported. In equipment of this kind the distributor system may in part at least be associated with or connected to such perforated plate and the various parts have to be introduced from the top so that a man has to do the necessary assembly job on the inside of the tank.

It must also be recalled that wherever the distributing system includes strainer heads, which is generally the case, such strainer heads have to be periodically cleaned and sometimes replaced and whenever this is necessary the treating unit has to be taken out of service, the entire bed of granular material has to be removed and the necessary cleaning has to be accomplished by again sending a man down into the interior to remove the distributing system and then replace it after cleaning has been accomplished. All of this is costly and time-consuming and frequently involves the shutdown of a plant or possibly, in order to avoid such shutdown, the provision of a duplicate unit which can be switched into operation while the unit to be cleaned is taken out of service. Naturally, this involves a duplication of the investment in treating equipment and requires much more capital than would otherwise be needed.

With the foregoing problems in mind the objects and advantages of the present invention will be better understood. They involve the provision of a filter-type bed of treating material in a suitable tank with strainer heads located in the bottom head or plate of the tank, which strainer heads are readily adapted for insertion and removal from the outside through openings in the head and which are connected to a collector manifold located on the outside of the tank below the head with quickly detachable means for securing each strainer head in its opening and connecting it to the manifold.

A concomitant object is to locate the strainer heads at the very bottom of the tank. This eliminates the pool of water which is customarily trapped in the bottom of the treatment tank and which requires a considerable degree of additional washing and rinsing water during operation of the unit.

A still further object is to provide equipment with which, if desired, a gravel supporting bed may be omitted which gravel bed, heretofore, has generally been employed under the bed of treating material. In the prior art the strainer heads and the collector manifold have generally been embedded in such a gravel layer partly on the theory that the strainer heads will require less frequent cleaning if the usually more finely divided treating material is prevented from directly embracing or contacting the strainer heads. With my invention this gravel bed can be omittted, if desired, and the treating material can be supported directly on the bottom head or plate of the tank even though it embraces and surrounds the strainer heads. The reason for this is that with my invention the strainer heads can be so easily and quickly cleaned that it is a matter of little consequence that the treating material is in direct contact with the heads.

Another object is to reduce the over-all height of the treating tank for a given capacity which is often an advantage of considerable value in situations where available space is limited.

Still another object is to reduce the outage time for a unit when cleaning, servicing, or replacing any of the parts of the distributing system is necessary.

Another very important object is to make it possible for the strainer system to be installed from the outside of the tank, which greatly reduces the amount of time required not only in originally installing the equipment but also subsequently when cleaning or repairs are required. An object which is directly associated with this object is avoidance of the necessity for removing the treating material and/or the bed of gravel on which it rests before cleaning of the strainer heads can be undertaken.

How the foregoing objects and advantages, together with such others as may appear hereinafter, are attained will now be described in connection with the accompanying drawings, wherein FIGURE 1 is a vertical section through a treating tank with my improved strainer and manifold system applied to the bottom head thereof;

FIGURE 2 is an enlarged side elevation of the strainer members shown in FIGURE 1 with one portion shown in section to illustrate a detail; and FIGURE 3 is a plan view of FIGURE 2 with a portion broken away to illustrate a detail of the strainer itself.

In the present, which is a preferred, embodiment of the invention, there is illustrated a treatment tank 4 having a bottom plate or head 5 and a top plate or head 6, both of which plates are outwardly dished in a manner familiar in this art. In the upper head 6 is a manhole which is normally closed by a suitable cover 6a.

The raw water which is to be treated, softened, or purified, enters through the pipe 7 under the control of a valve 8 which delivers to a suitable valve control box 9 the interior details of which are not illustrated because they form no part of the present invention. Suffice it to say that the raw water passes outwardly from the control box 9 through the pipe 10 which delivers to the inlet distribution system 11 located inside of the tank at a point near the upper plate or head 6.

From the distributing system 11 the water passes downwardly through the tank through a bed 12 of granular treating material which, for example, will be considered to be a water softening material such as a natural or artificial zeolite. When this invention I prefer that the bed 12 be supported directly on the inside of the bottom head 5 and for this reason it will embrace or surround the straining heads or members 13 to be more fully described below.

In the structure illustrated there are five straining members 13 ( only three of which appear in the drawings since the remaining two are located in a different plane) but it is obvious that any suitable number may be employed depending upon the size of the unit and the individual preference of the designer.

Outside and just below the bottom plate or head 5 is a manifold 14 in which the treated or softened water is collected and from which it is delivered through the pipe 15 to the control box 9. The treated water leaves the control box 9 and is delivered to the treated water outlet 16 from whence it is carried to whatever point of use it is intended for.

When the treating material 12, which in the present instance is considered to be a water softening material, requires regeneration, the control valves are suitably manipulated and brine or regenerating solution is delivered through the pipe 17 to a brine distribution system 18 located in the tank at a point above the softening medium 12. As the brine percolates downwardly through the bed 12 the residual water in the tank passes outwardly through the strainer members 13 and is collected in the manifold 14, from which it is delivered via the pipe 15 to the valve control box 9 and then outwardly through the discharge pipe 19 which delivers to the sump 20 located under the equipment in some convenient location. There is a valve 21 for controlling this discharge, but the details of this control are not necessary to an understanding of the present invention. After discharge from the pipe 19 into the sump 20 the water flows out through the bottom drain 22 which leads to waste or to a sewer.

After the base exchange material 12 has been suitably regenerated in accordance with practices which are thoroughly familiar to the art, the brine is washed from the bed by introducing raw water at the top through the pipe 10 and the distributor 11 with discharge taking place down through the lower distributing system and then out through the same pipe 19 as already described.

It will also be realized, since it is common practice in the art, that back washing of the bed must be effected and this is accomplished by passing raw water downwardly through the pipe 15 and then through the manifold 14 and upwardly through the strainer heads 13 and the bed 12. During this procedure the distributing system 11 receives the back wash water and discharges it through the pipe 10 into the control box 9, from which it passes outwardly through the drainpipe 23 into the sump 20, the pipe 23 also being provided with a suitable control valve 24 the details and method of operation of which are not important for the purposes of the present invention.

The strainer heads or members 13 are so designed and constructed as to be readily insertable and removable through suitable apertures through the bottom head or plate 5 and this is done from the outside of the tank. Surrounding each strainer opening is a coupling or connecting collar 25 which may be secured in place as by welding 26.

Each of the strainer heads is composed of a section of pipe 27 which carries at its upper end a plurality of interior rib-like members 28 around which is wrapped a suitably shaped wire with the coils of the wire separated slightly to provide straining openings 29 between the turns of the wire in a manner familiar to those skilled in this art.

Within its collar 25 each strainer pipe 27 is provided with an O-ring seal 30 which is fitted into a groove in the inner wall of the coupling collar 25 in a manner best shown in FIGURE 2. This O-ring seal prevents leakage of fluid from the interior of the tank down between the strainer pipe 27 and the inside of the collar 25.

The strainer pipe 27 carries a through-pin 31 which projects laterally at opposite sides for cooperation with the bayonet-type slot 32 in the collar 25. By rotating the strainer pipe 27 it will be seen that the ends of the pin 31 will ride upwardly and then downwardly in the slots 32 so that the strainer can be quickly and readily withdrawn from its operative position so that it may be cleaned or replaced as may be necessary.

For convenience, a second pin 33 extends through the lower end of the strainer pipe 27 in position to be grasped by a suitable wrench or tool which is employed when the pipe has to be removed in the manner described.

The pipe 27 at the top above the coils 28 is closed by a wall 34.

Incidentally, it should be mentioned that the pin 33 is somewhat longer than the pin 31, but this is so only as a matter of convenience in attaching a wrench and has nothing to do with the invention per se.

Between the lower end of each strainer pipe 27 and the manifold 14 there is provided a flexible connecting pipe or conduit 35 which is constructed in such a way as to make it possible to turn the strainer pipe 27 as described and to withdraw said pipe with its strainer portion down and out of the tank through the opening in the head 5 which is provided therefor, without disturbing the manifold. When this is done the softening material 12 or other granular treating medium will simply arc over the opening from which the strainer head has been removed so that none of the material will be lost by falling down through the opening.

The advtantages of the invention will now be obvious. In the first place, it is unnecessary for a workman to get down into the interior of the tank in order to install or remove the straining system at the bottom. With my invention this can be done entirely from the outside of the tank—all that it is necessary to do being to provide suitable space within which the man can work under the tank. Preferably no gravel is employed nor is it required with the invention although there is no reason why gravel should not be used, if so desired, provided only that its particle size is sufficiently small that it will not flow outwardly through the strainer openings when the strainer members are removed.

The invention also eliminates the creation of a sluggish pool of water or spent regenerant in the bottom of the tank inasmuch as the strainer heads are located at the very lowest level in the tank. This makes it possible to greatly reduce the amount of wash and rinse water required during normal operation of a softener of this type.

Still further, the over-all height of equipment of this kind can be reduced by employing the features of the present invention and the initial cost of installing the equipment is less and the matter of making necessary repairs or cleaning the strainer heads can also be accomplished at a minimum of expense.

Since the strainer heads can be removed through the bottom it is not necessary, when a cleaning operation is required, to first remove all of the softening material and then send a man down on the inside of the tank. This means that the outage time for the unit whenever service or cleaning are required is reduced to the absolute minimum.

I claim:
1. In water treating equipment employing a filter-type bed of small-particled treating material, the combination of a tank having a bottom head, a plurality of openings in said head, strainer members adapted for ready insertion and removal through the openings from outside the head, a collector manifold below the head, quickly detachable means securing each strainer member in its opening, and fluid connection means between each strainer member and the manifold, all so arranged that said strainer members may be removed without disturbing said manifold.

2. Equipment according to claim 1 wherein the fluid connection means includes a flexible conduit between the strainer member and the exterior manifold.

3. Equipment according to claim 2 wherein the quickly detachable means comprises a bayonet-type coupling.

4. Equipment according to claim 1 wherein the treating material surrounds the strainer members and is supported on the surface of the bottom head.

References Cited by the Examiner

UNITED STATES PATENTS

| | | | |
|---|---|---|---|
| 417,038 | 12/1889 | Hyatt | 210—279 X |
| 1,191,741 | 7/1916 | Scull | 210—172 |
| 1,753,900 | 4/1930 | Naef | 210—459 X |
| 2,033,533 | 3/1936 | Moore | 210—289 X |
| 2,643,772 | 6/1953 | Martin | 210—289 X |
| 2,922,525 | 1/1960 | Ward et al. | 210—289 |

REUBEN FRIEDMAN, *Primary Examiner.*

SAMIH ZAHARNA, *Examiner.*